July 7, 1970  K. E. A. GÖTHBERG  3,519,316
ROLLING BEARING UNIT

Filed June 14, 1968  10 Sheets-Sheet 1

Fig. 1

INVENTOR
KARL EVALD ANDREAS GÖTHBERG
BY Howson & Howson
ATTORNEYS

July 7, 1970 K. E. A. GÖTHBERG 3,519,316
ROLLING BEARING UNIT
Filed June 14, 1968 10 Sheets-Sheet 4

INVENTOR
KARL EVALD ANDREAS GÖTHBERG
BY
ATTORNEYS

July 7, 1970  K. E. A. GÖTHBERG  3,519,316
ROLLING BEARING UNIT

Filed June 14, 1968  10 Sheets-Sheet 10

Fig.16

INVENTOR
KARL EVALD ANDREAS GÖTHBERG
BY
ATTORNEYS

United States Patent Office 3,519,316
Patented July 7, 1970

3,519,316
ROLLING BEARING UNIT
Karl Evald Andreas Göthberg, Lerum, Sweden, assignor to Aktiebolaget Svenska Kullagerfabriken, Goteborg, Sweden, a corporation of Sweden
Filed June 14, 1968, Ser. No. 737,208
Int. Cl. F16c 33/78; F16j 15/32
U.S. Cl. 308—187.1                                    4 Claims

ABSTRACT OF THE DISCLOSURE

A bearing unit consisting of a housing having a cylindrical seat and a rolling bearing assembly comprising inner and outer rings and a plurality of rolling elements in the annular space between the rings, said rolling bearing assembly being mounted in said seat and at least one of said rings having a circumferentially extending groove in its outer surface confronting the seat, a seal for covering the annular space at least at one end of the bearing assembly said seal comprising a circular sheet metal plate and a ring of resilient material fixed to the outer edge of said plate engageable in said groove and having an outer diametral dimension greater than the diametral dimension of said seat whereby the resilient member is under compression when the bearing is mounted in the housing, said plate member having an axial flange portion overlying a land on said one ring between its outer axial endface and said groove.

---

The present invention relates to a bearing unit comprising a bearing housing having a circular cylindrical bearing seat and a rolling bearing the outer cylindrical surface of which fits into the said bearing seat, one or both sides of the said rolling bearing being covered by a sealing plate fixed in a suitable manner to the outer race ring of the bearing, for instance in a groove in the outer surface of the outer race ring, one of the said sealing plates at least before the bearing is mounted in the housing projecting in a radial direction outwardly beyond the outer cylindrical surface of the outer race ring of the bearing.

It has previously been proposed in a rolling bearing intended to be mounted with its outer cylindrical surface fitting into a seat to fix a sealing plate in a groove in the said outer surface. Usually, however, these sealing plates have been formed and dimensioned so that they do not contact the seat. The sealing plates thus do not participate actively in fixing the bearing in the bearing housing. By forming the sealing plate as above mentioned in accordance with the invention the advantage is obtained that the bearing, which is already protected against its surroundings, may be mounted in a cylindrical seat without requiring fixed or loose shoulders and/or covers. As a result hereof the bearing unit, comprising the bearing with its housing, will be simpler and cheaper than is the case with conventional mountings. In several forms of the invention the sealing plate will become more firmly attached to the bearing when the bearing is mounted in its seat and the sealing plate will serve both as a seal and to lessen vibration and counteract relative movement between the bearing housing and the bearing.

The invention will be described in the following with reference to the accompanying drawings in which.

Figure 1:
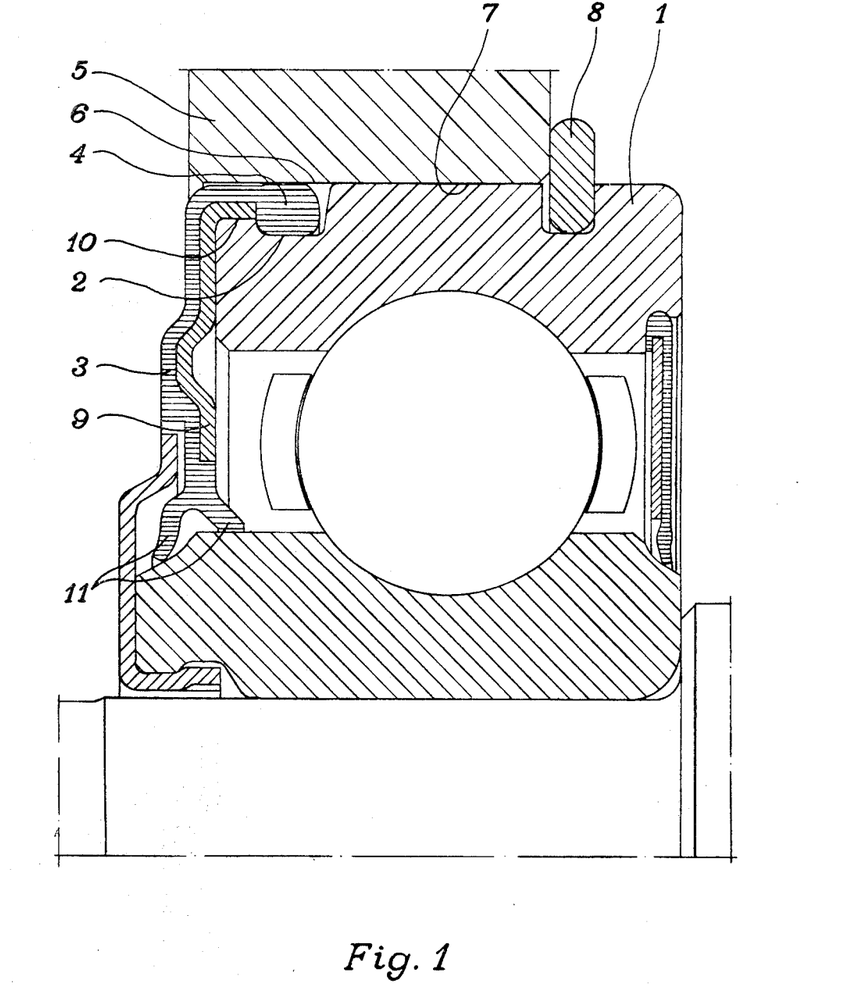
FIG. 1 shows a bearing unit in which the portion of the sealing plate extending radially outwards of the outer cylindrical surface of the bearing is made of rubber, plastic or other material having similar elastic qualities.

The bearing unit according to FIG. 1 comprises a ball bearing 1, the outer race ring of which is provided with an external annular groove 2 in its cylindrical surface in which a sealing plate 3 is fixed by means of a resilient portion 4. The bearing unit consists further of a bearing housing 5 having a seat formed by a cylindrical bore 6 therein. Before the bearing is mounted the resilient portion 4 of the sealing plate extends radially beyond the outer cylindrical surface of the bearing. When the bearing has been mounted as shown in FIG. 1 the resilient portion 4 will sealing engage the bearing seat. It can be made to engage at the same time with the bottom of the groove 2 thus forming an effective, well sealing means for fixing the plate 3. In order to make possible the use of the widest possible tolerances in forming the groove the latter has been dimensioned so that the elastic portion does not entirely fill the groove in mounted condition. The central portion 7 of the race ring which carries the heaviest radial load concentration is in firm contact with the bearing housing 5 thereby facilitating the cooling of the bearing. The sealing plate 3 comprises a reinforcing plate 9 of mild steel or similar material which is covered externally by an elastic material which forms the portion 4 and also provides sealing lips 11 which slide against the inner race ring of the bearing. The reinforcing plate is centered on a cylindrical surface 10 of the outer race ring thus securely fixing the sealing plate in the radial direction. When the bearing is free (i.e. before mounting) the sealing plate can easily be snapped onto the outer race ring. Since the portion 4 of the plate when in mounted position is entirely or partially covered by the bearing housing the sealing plate 3 will become still more securely fixed in position when the bearing is mounted in the housing and the sealing plate can therefore be made to be easily dismountable when the bearing is free. The bearing is fixed in the axial direction in the housing by a snap ring 8. This form of mounting is useful in for instance electric motors. With the sealing plate 3 according to the invention the bearing and the interior of the motor is completely sealed off from its outer surroundings. Sealing plates formed in this manner can, of course, be formed as end plates and they can also be used with axially slidable bearings. Resilient members, such as the member 4, decrease vibration and have also been found effectively to fix a bearing ring also in a tangential direction even when it is mounted with a loose fit. In such cases it prevents the outer race from creeping when subjected to small radial loads rotating relative to the outer race ring.

Figure 2:
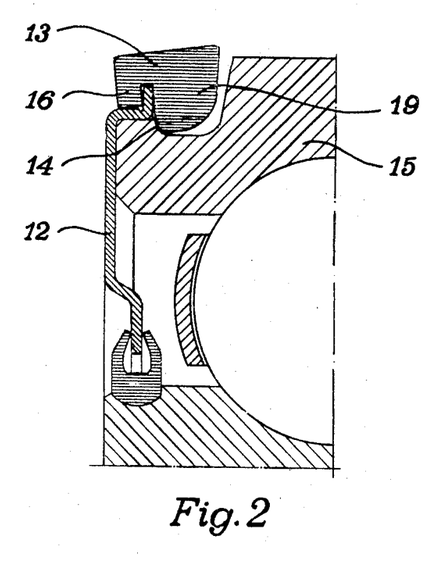
FIGS. 2 and 3 show a bearing in which the sealing portion of the plate and the elastic portion thereof are in two separate parts.
Figure 3:
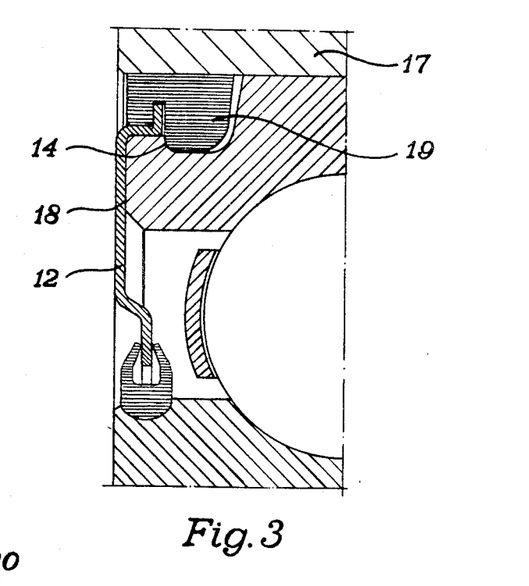

In order more firmly to fix the sealing plate in an axial direction when mounted in the bearing housing the plate may be formed as shown in FIG. 2. In this case the sealing plate consists of a metal plate 12 and a separate resilient ring 13 having portions 16 and 19 gripping the edge of the plate and engaging a surface 14 in the outer race ring 15 of the bearing. When the bearing is inserted in a housing 17 having a cylindrical seat as shown in FIG. 3 the plate 12 is pressed against the side face 18 of the outer race ring due to increase in the pressure at the surface 14. This may result either because the portion 19 is forced over the portion 14 as shown in FIGS. 2 and 3 or because the groove 20 in the bearing ring has a conical engaging surface 21 for engaging the portion 22 as shown in FIG. 4.

Figure 4:
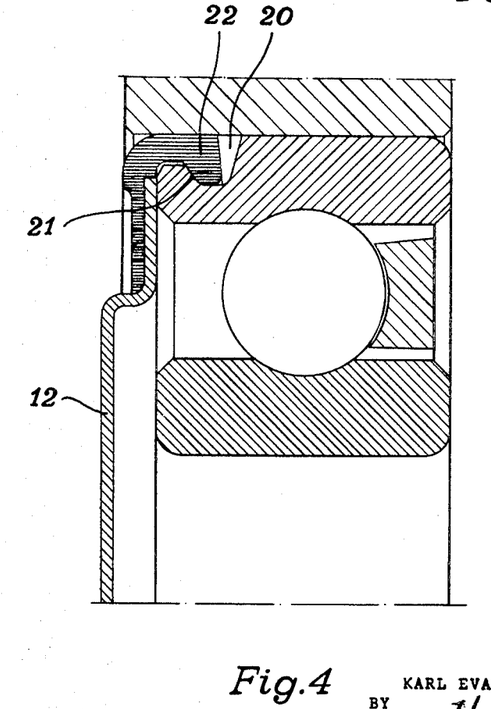
FIG. 4 shows a form in which one side of the groove in the outer race ring is conical.

The plate 12 in FIG. 2 and the resilient ring 13 are in two separate parts while the plate 12 and the elastic ring of FIG. 4 are vulcanized to each other to form a single unit. The form according to FIG. 4 is suitable for use in cases when some other member, for instance a sealing lip, slidingly engages a portion of the plate. Both side faces of the plate without further preparation form good sliding surfaces for sealing lips or other contacting members. The surfaces of a plate to which some other material, for example rubber, is to be fixed by an adhesive or by vulcanization must usually be roughened or coated and consequently must be subjected to a finishing operation, if, for instance, a sealing lip is to slide against the surface.

When a bearing is to be inserted into a bearing housing it is desirable that the edge of the bearing to be first inserted be provided with a preferably cylindrical portion of somewhat smaller diameter. In the form shown in FIG. 5 the sealing plate is provided with a cylindrical and/or conical portion 24 having an outer diameter somewhat less than that of the outer race ring 25. Within the portion 24 is mounted an elastic ring having a portion 26 so shaped and dimensioned that before mounting in the housing a portion 27 thereof (shown in chain lines) will project radially outwardly beyond the cylindrical outer surface of the bearing. A groove 28 is provided in the outer race ring 25 having a rounded bottom for which reason the pressure from the bearing housing exerted on the portion 27 when the bearing is mounted in the housing will give rise to a pressure acting internally on the cylindrical/conical portion 24 of the sealing plate which thus serves to retain the sealing plate 23 more firmly. In order that the portion 26 may retain the sealing plate 23 firmly before the bearing is mounted in the housing it is provided with a preferably cylindrical portion 29. The portion 26 is prevented from becoming twisted or turned inside out by the portion 29 when the sealing plate is mounted on the free bearing. In the form shown the sealing plate 23 and the ring 26 comprise two separate parts. They may, however, be combined into a unit by vulcanizing them together or by a press fit between them.

Figure 5:
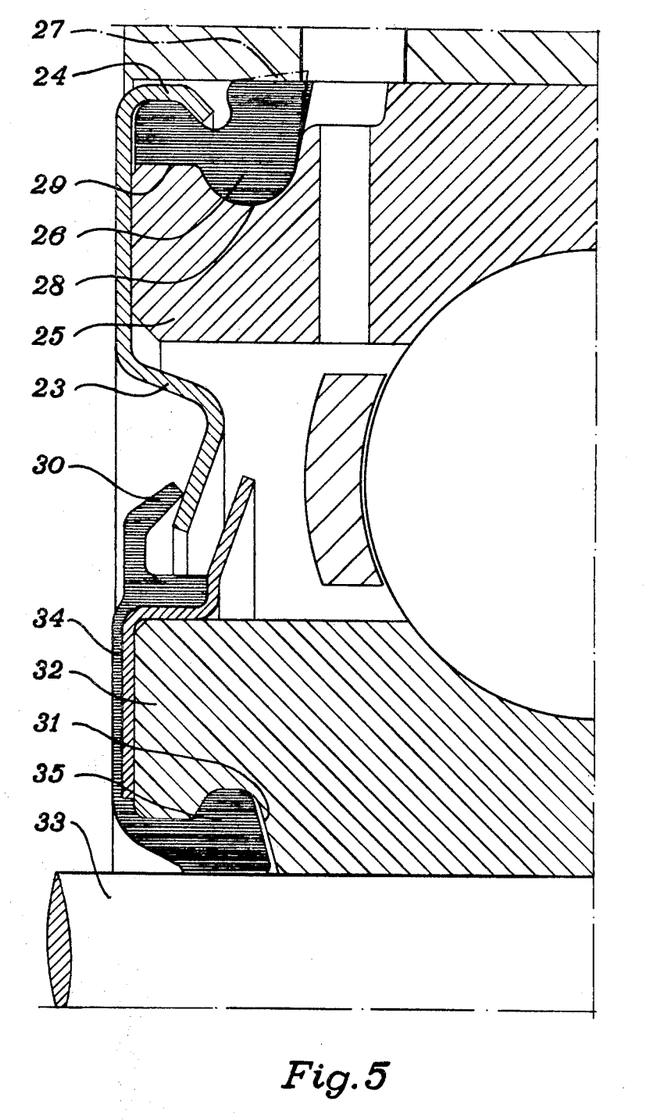
FIG. 5 shows a bearing in which both an outer and an inner sealing plate are attached to the bearing in accordance with the invention and in which provision is made for introducing lubricant into the bearing.

FIG. 5 also shows a seal which can discharge superfluous grease having a sealing lip 30 sliding against the sealing plate 23. In this case it is of advantage to make the sealing plate as a separate member the surface of which can conveniently serve as a sliding surface for the lip as mentioned above.

In the design of FIG. 5 there is also provided an inner sealing plate which as shown in FIG. 5 is attached to the inner race ring in principle in the same manner as the outer one. A groove 31 in the inner race ring 32 is adapted to receive a ring 35 which projects somewhat inwards of the bore of the ring before the ring is mounted on the shaft 33.

Figure 6:
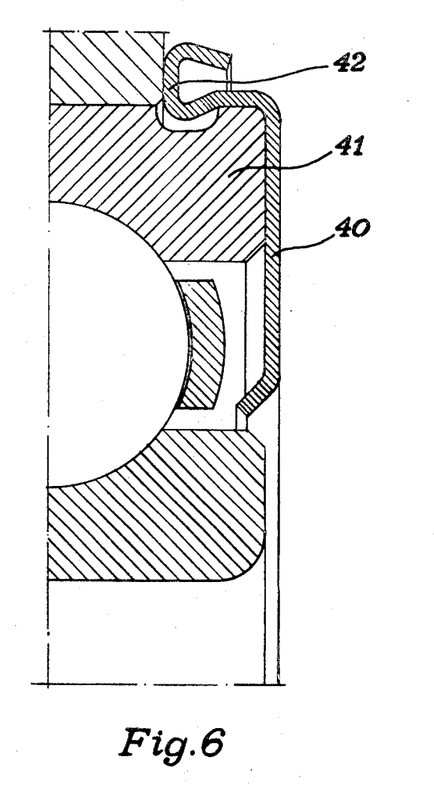
FIG. 6 shows a form in which the portion of the sealing plate extending radially beyond the bearing provides a shoulder which fixes the bearing in an axial direction.

FIG. 6 shows a sealing plate 40 with a portion 42 extending radially outwardly of the bearing 41. This portion 42 forms a shoulder which fixes the bearing 41 in one axial direction. This form of sealing plate may with advantage be used instead of the usual snap ring shown at 8 in FIG. 1, thus providing a bearing mounting suitable for instance for electric motors or the like where the shaft is fixed axially by a shoulder at one side of each of a pair of bearings.

Figure 7:
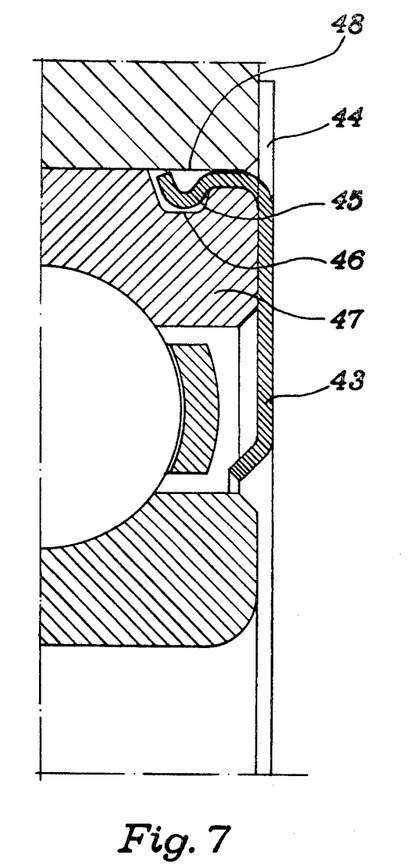
FIG. 7 shows a sealing plate having radially extending tongues which form a shoulder.

FIG. 7 shows a similar sealing plate 43 of steel or other metal in which, however, the shoulder is formed only by a number of tongues 44 while portions 45 between the tongues are formed to engage with a groove 46 in an outer ring 47 of a bearing. In this case the portions 45 are effectively prevented by the cylindrical seat 48 from slipping out of the groove as a result of thrust on the bearing. The tongues 44 may be bent yieldingly to engage the bearing housing. The sealing plate 43 may, if desired, be made of a plastic or other similar material in which case the portions 44 and 45 may be formed as continuous undivided members. The whole side face of the bearing will in this case be covered by an electrically insulating material which is of great advantage in electric motors since the distance between the windings and the bearing may be decreased and the motor thus be made shorter.

Figures 8, 10:
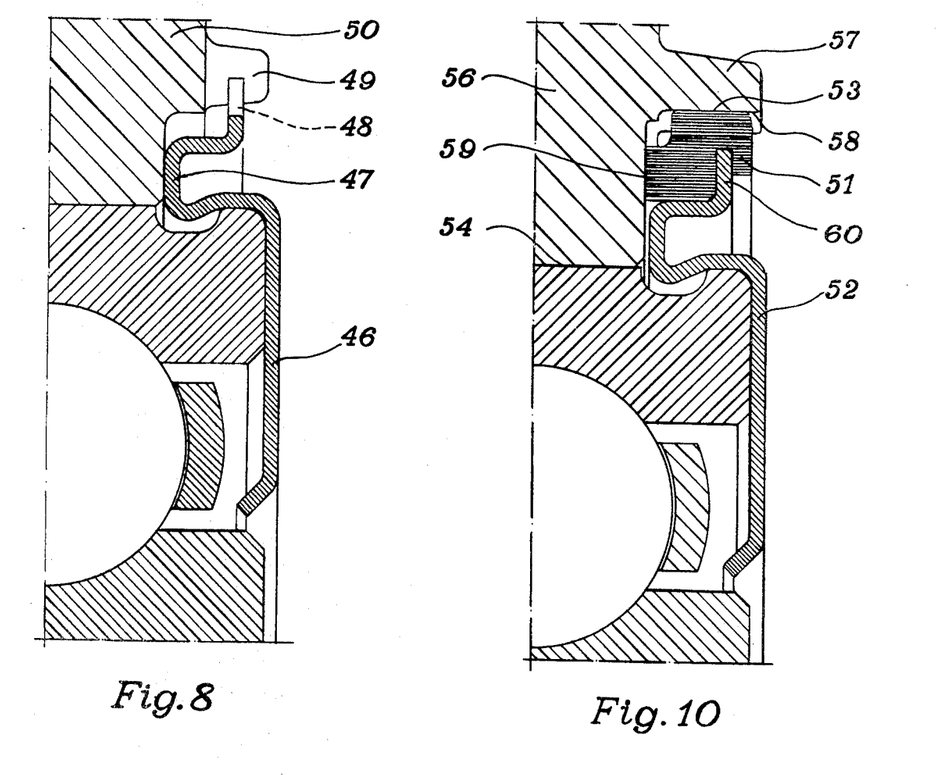
FIG. 8 shows a bearing in which the sealing plate serves to fix the bearing in both axial and tangential direction.
FIG. 10 shows a bearing in which the sealing plate is provided with an elastic contacting member.
Figure 9:
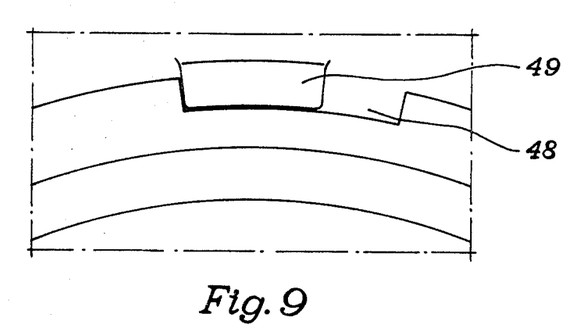
FIG. 9 shows a side view of the bearing shown in FIG. 8.

Especially in cases when the seat for the bearing is made for instance of light metal and a loose fit is desired between the bearing and the seat complications may arise through creeping of the outer race ring of the bearing in the bearing seat. When the load is small this can be prevented by an elastic member as shown in FIG. 1. When more effective means for preventing creep are required a device as shown in FIGS. 8 and 9 may be provided. A sealing plate 46 which according to the invention forms an annular shoulder 47 is provided at its outer edge with one or more notches 48 into which one or more lugs 49 on the bearing housing 50 project.

Figure 11:
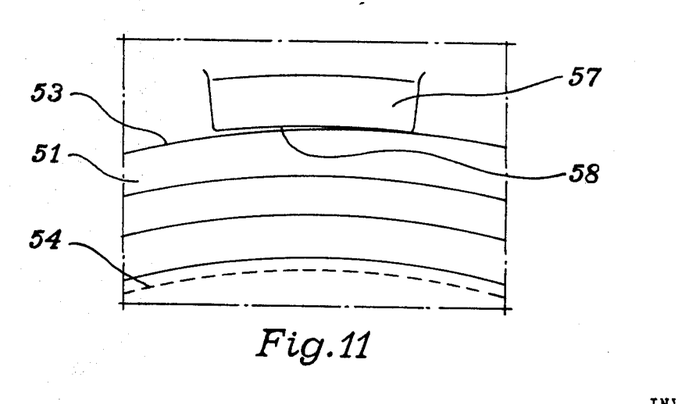
FIG. 11 shows a portion of a side view of the bearing according to FIG. 10.

A sealing plate 52 as shown in FIGS. 10 and 11 is provided with an elastic member 51 having an outer circular cylindrical surface 53 eccentrically located relative to the outer cylindrical surface 54 of the bearing. A lug 57 projects from a bearing housing 56 having its inner face 58 located nearer the centre of the bearing than the highest point of the outer surface 53 of the member 51. When the outer race ring tends to rotate in the bearing seat the lug 57 and the surface 53 of the elastic member 51 will engage each other. The eccentric surface 53 will then force the bearing ring against the portion of the seat opposite the lug. In this manner an effective locking force increasing with the moment exerted on the outer race ring will be obtained. The whole side face, or only a portion thereof, of the elastic member will engage axially with a plane surface 59 of the bearing housing. With this form of the invention the race ring is elastically restrained from rotating which contributes to the prevention of wear on the contacting surfaces even if the housing in which the seat is formed is made of a material less resistent to wear such as aluminium. The outer portion 60 of the sealing plate 52 may also be made eccentric relative to the outer cylindrical surface of the bearing in which case the elastic member 51 may be made with substantially constant height in the radial direction. When the elastic member is not required the outer portion 60 of the sealing plate 52 may be provided with an eccentrically located outer edge which functions in the same manner as the elastic member shown. Both the lug 57 and the surface 58 of the lug may be extended around the whole or part of the circumference and may be either straight or circular or be curved in some other manner so that the desired wedging effect is obtained when the bearing tends to turn in the seat.

Figure 12:
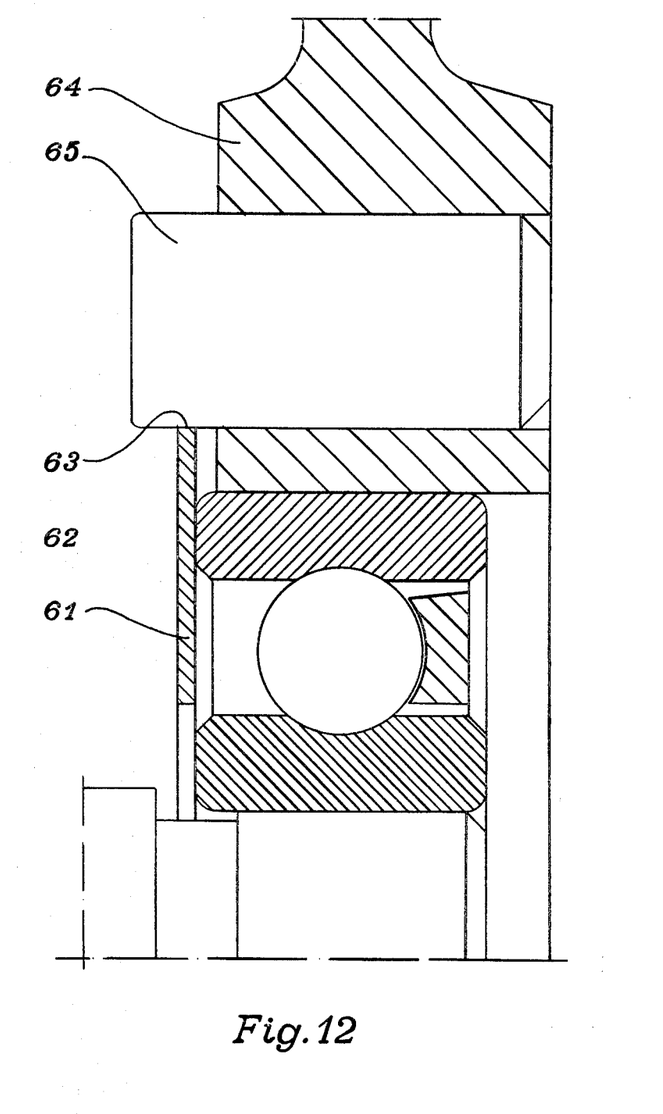
FIG. 12 shows a bearing in which the sealing plate is attached to the outer race ring of the bearing by an adhesive.

The bearing may be restrained from tangential movement even in cases when the sealing plate is fixed to the bearing ring by means of an adhesive or welding as shown in FIG. 12. This figure shows a sealing plate 61 having an edge 63 which is eccentric relative to the cylindrical surface 62 of the bearing ring engaging a cylindrical plug 65 mounted in a bearing housing 64. This plug may be made of an elastic material, for instance rubber, whereby an elastic non-wearing contact is obtained.

Figure 13:
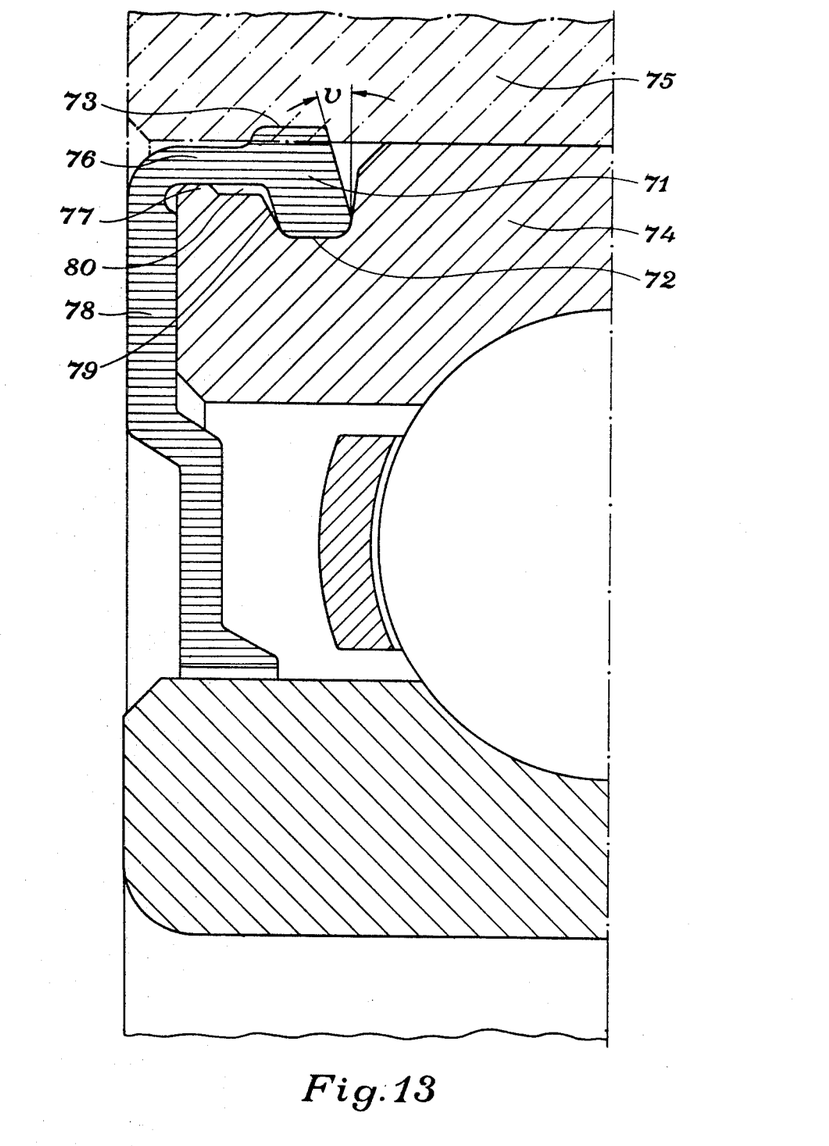
FIG. 13 shows a bearing in which the outer portion of the sealing plate is formed in a special manner.

FIG. 13 shows a sealing plate of an elastic material in which the portion 71 for attaching it to the bearing has a cross section in the form of a rhomboid or similar figure having cylindrical surfaces 72 and 73 for contact with the bearing ring 74 and the housing 75 respectively displaced axially somewhat relative each other. For this reason the angle $v$ formed by the sides will vary depending on the tolerances and the deformation in the rubber material and the variations in the pressure will therefore be considerably less than if the cross section of the portion 71 had been symmetrical. A ring having the cross section shown in the figure can therefore, if required, be made of relatively hard plastic or rubber without risk that the contact pressure will be too great.

It would hardly be possible for this purpose to use a rubber ring consisting only of the portion 71. The tendency of the portion 71 to increase the angle $v$ of its slope under radial load should be moderated by a mainly cylindrical portion 76 connected to the portion 71 and radially thinner than the latter and connected at its other side to the wall 78 of a sealing plate. There should, of course, be a certain amount of space 79 and 80 between the portions 71 and 76 and the race ring 74. Further stabilization of the portion 71 may be obtained if the portion 76 is supported by a flange 77 on the race ring 74. A loose sheet metal washer of corresponding diameter may be substituted for the flange 77. A washer of this kind is shown in FIG. 15.

Figure 14:
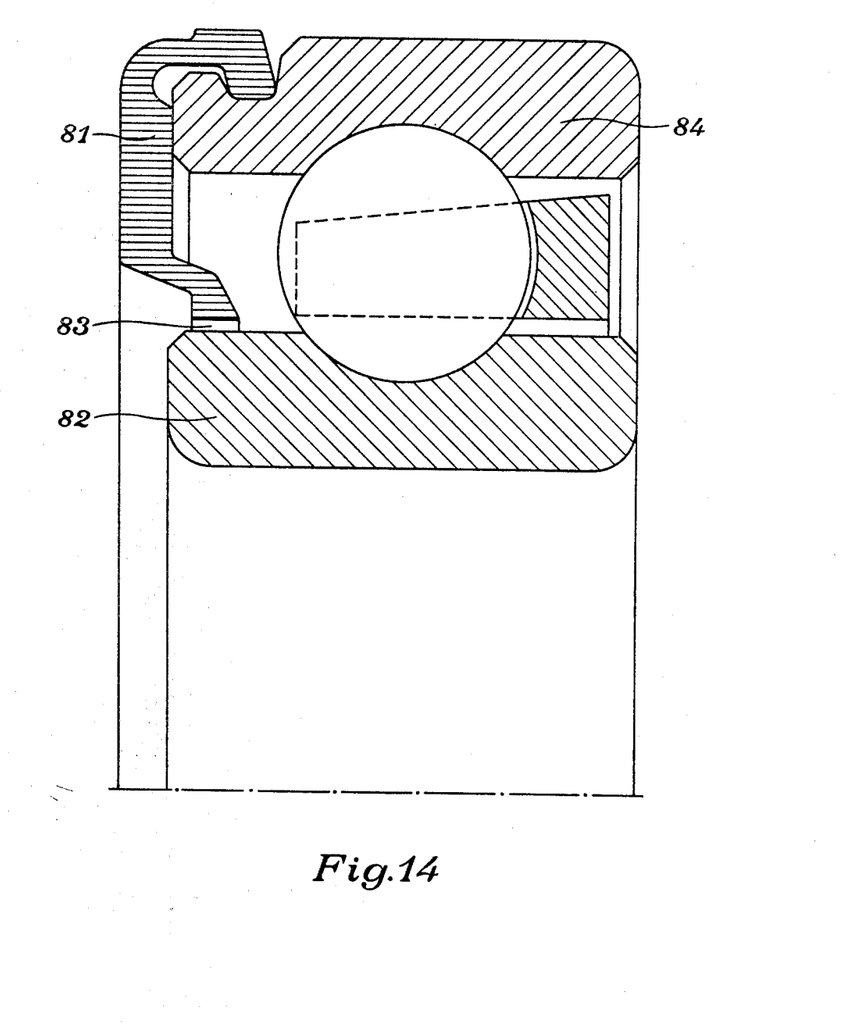
FIG. 14 shows a sealing plate resembling that of FIG. 13 but of somewhat modified form.

In certain cases, for instance for small bearings, the flange 77 and the sheet metal washer can be dispensed with and the wall 78 will give the required degree of stability to the portions 71 and 76. FIG. 14 shows an example of this kind. A sealing plate 81 is fixed to the outer race ring 84 of the bearing in the manner described above and forms together with the inner race ring 82 a narrow opening 83 which in many cases is sufficient protection against entry of dust or the like.

Figure 15:
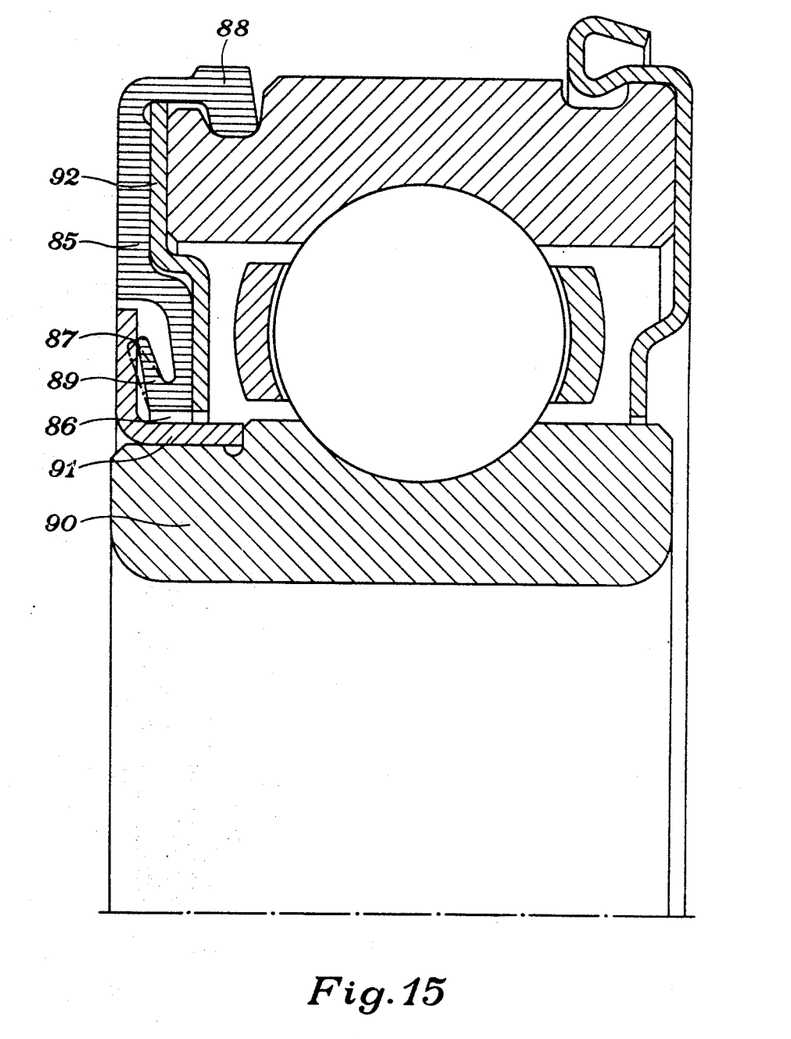
FIG. 15 shows a sealing plate so formed as to protect the bearing from intrusion of gases or liquids.

FIG. 15 shows a sealing plate of a type which may be used to protect a bearing from gases or liquids even when these are under pressure. This seal is a combination of a non-contacting seal at 86 and a sliding lip seal at 87. The peripheral portion 88 of the sealing plate has a sealing wall similar in principle to that described above in connection with FIG. 13. The inner portion of the sealing plate has a lip-shaped flange 89 which slides against a collar 91 of sheet metal mounted on the inner ring 90 of the bearing. This flange also serves to protect the lip. A sheet metal washer 92 is provided to prevent the flexible wall from being bent inwards under outer pressure.

Figure 16:
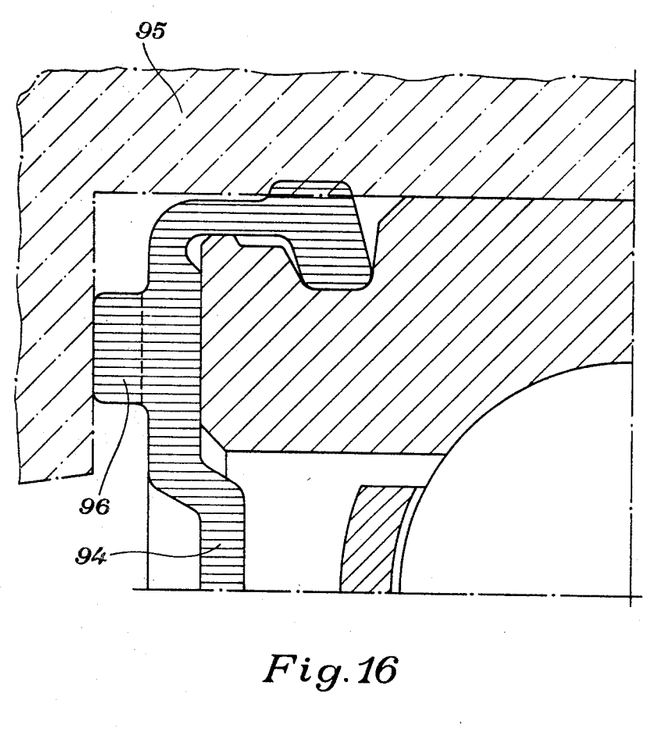
FIG. 16 shows a sealing plate which engages with the housing also in an axial direction.

FIG. 16 shows a type of sealing plate 94 which differs from the above described in that it also contacts axially with a bearing housing 95. The sealing plate, which may be made of plastic or rubber, is provided with an axially extending flange 96 which may be either continuous or interrupted to make it more elastic. This design is suitable for use with bearings for carrying thrust load.

I claim:
1. A bearing unit consisting of a housing having a cylindrical seat and a rolling bearing assembly comprising inner and outer rings and a plurality of rolling elements in the annular space between the rings, said rolling bearing assembly being mounted in said seat and at least one of said rings having a circumferentially extending groove in its outer surface confronting the seat, a seal for covering the annular space at least at one end of the bearing assembly, said seal comprising a circular sheet metal plate and a ring of resilient material fixed to the outer edge of said plate engageable in said groove and having an outer diametral dimension greater than the diametral dimension of said seat whereby the resilient member is under compression when the bearing is mounted in the housing, said plate member having an axial flange portion overlying a land on said one ring between its outer axial end face and said groove.

2. A bearing assembly as claimed in claim 1 wherein the outer resilient portion completely overlies said plate-like member and terminates in a bifurcated inner sealing lip which engages the inner ring.

3. A bearing assembly as claimed in claim 2 including means for fixing the bearing assembly in an axial direction relative to said housing.

4. A bearing assembly as claimed in claim 3 wherein said means comprises a snap ring engaging a groove in the outer ring.

References Cited

UNITED STATES PATENTS

| | | | |
|---|---|---|---|
| 1,510,806 | 10/1924 | Snider | 308—36.1 |
| 2,639,954 | 5/1953 | Potter | 308—187.2 |
| 3,120,983 | 2/1964 | Sommer | 308—187.1 |
| 3,245,735 | 4/1966 | Sikora | 308—187.1 |
| 3,284,145 | 11/1966 | Bixby | 308—187.2 |
| 3,357,529 | 12/1967 | Binder | 308—187.2 |
| 3,376,084 | 4/1968 | McKee | 308—187.1 |
| 3,396,977 | 8/1968 | Iguchi | 308—187.2 |

FOREIGN PATENTS 506,248  12/1954  Italy.

MARTIN P. SCHWADRON, Primary Examiner

L. L. JOHNSON, Assistant Examiner

U.S. Cl. X.R.

277—189; 308—187.2

UNITED STATES PATENT OFFICE
CERTIFICATE OF CORRECTION

Patent No. 3,519,316   Dated July 7, 1970

Inventor(s) Karl E. A. Gothberg

It is certified that error appears in the above-identified patent and that said Letters Patent are hereby corrected as shown below:

Immediately below the last line of the caption of said patent, insert the following:-

"Claim priority, application Sweden No. 8493/67, filed June 16, 1967".

(SEAL)
Attest:

Edward M. Fletcher, Jr.
Attesting Officer

WILLIAM E. SCHUYLER, JR.
Commissioner of Patents